US010295895B2

(12) United States Patent
Sakamoto et al.

(10) Patent No.: US 10,295,895 B2
(45) Date of Patent: May 21, 2019

(54) PROJECTION TYPE IMAGE DISPLAY APPARATUS FOR IMPROVING ILLUMINATION OF A LIGHT SOURCE

(71) Applicant: MAXELL, LTD., Kyoto (JP)

(72) Inventors: Shuichi Sakamoto, Kyoto (JP); Kazuo Shikita, Kyoto (JP); Hiroyuki Nakamura, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/770,096

(22) PCT Filed: Oct. 22, 2015

(86) PCT No.: PCT/JP2015/079778
§ 371 (c)(1),
(2) Date: Apr. 20, 2018

(87) PCT Pub. No.: WO2017/068676
PCT Pub. Date: Apr. 27, 2017

(65) Prior Publication Data
US 2018/0314143 A1 Nov. 1, 2018

(51) Int. Cl.
G03B 21/20 (2006.01)
G03B 21/00 (2006.01)
G03B 21/14 (2006.01)
G02B 27/09 (2006.01)
G02B 27/30 (2006.01)

(52) U.S. Cl.
CPC ..... *G03B 21/2066* (2013.01); *G02B 27/0955* (2013.01); *G02B 27/0977* (2013.01); *G02B 27/30* (2013.01); *G03B 21/00* (2013.01); *G03B 21/14* (2013.01)

(58) Field of Classification Search
CPC ............ G03B 21/2066; G02B 27/0955; G02B 27/0977; G02B 27/30
See application file for complete search history.

(56) References Cited

U.S. PATENT DOCUMENTS 6,283,615 B1   9/2001  Takahashi
2005/0157268 A1* 7/2005  Akiyama ............... H04N 9/315
                                                           353/38

FOREIGN PATENT DOCUMENTS

JP        06-342158 A    12/1994
JP     2000-028963 A     1/2000
(Continued)

*Primary Examiner* — Sultan Chowdhury
*Assistant Examiner* — Magda Cruz
(74) *Attorney, Agent, or Firm* — Volpe and Koenig, P.C.

(57) ABSTRACT

The purpose of the present invention is to provide a projection type image display apparatus which is simple in configuration, low in price, and improved in reliability and brightness of an illumination light source. The present invention is a projection type image display apparatus provided with: a lamp; a reflector that reflects a light flux emitted from the lamp; a collimating lens that collimates the light reflected by the reflector; a light modulation device that modulates the collimated light to output the modulated light; and a projection lens that projects the modulated light. The reflector is configured to prevent the lamp from being irradiated with the reflected light of the light flux emitted from the lamp, and the collimating lens is formed of one biconcave lens having concave surfaces on both the incident side and the exit side.

11 Claims, 4 Drawing Sheets

(56) References Cited

FOREIGN PATENT DOCUMENTS

| | | |
|---|---|---|
| JP | 2000-298310 A | 10/2000 |
| JP | 2002-350778 A | 12/2002 |
| JP | 2006-184677 A | 7/2006 |
| JP | 2008-216727 A | 9/2008 |
| JP | 2008-242156 A | 10/2008 |
| WO | 2005/036255 A1 | 4/2005 |

\* cited by examiner

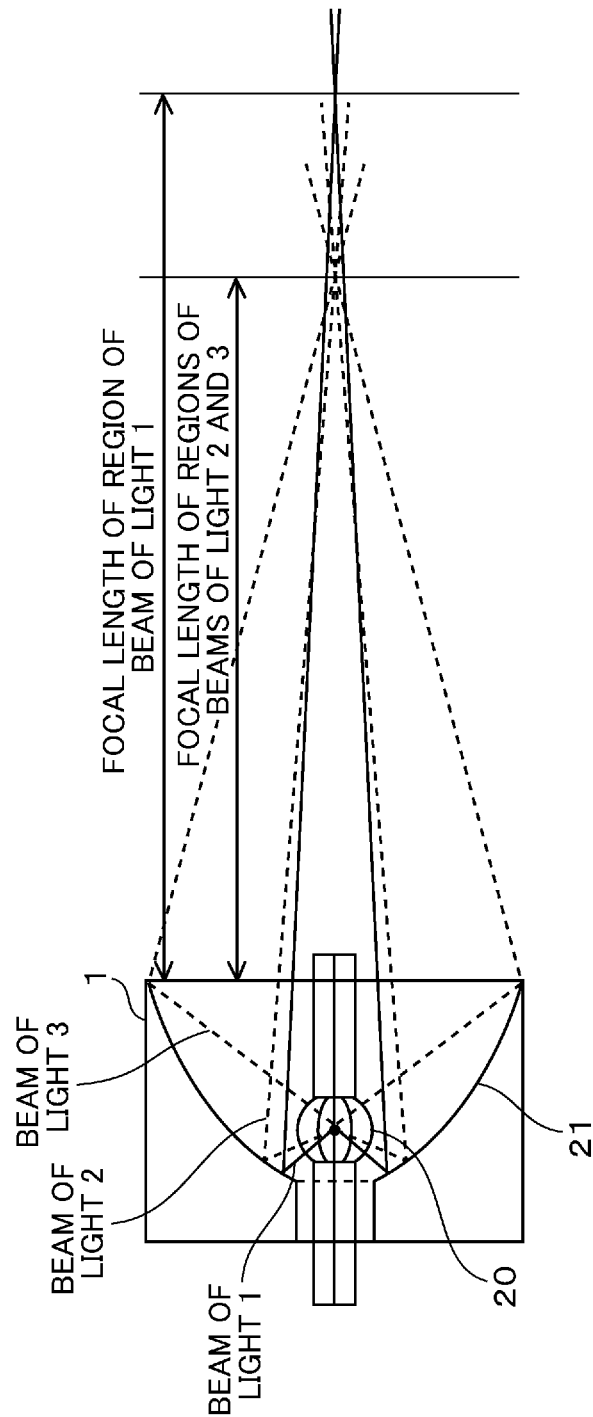
F I G. 2

F I G. 5
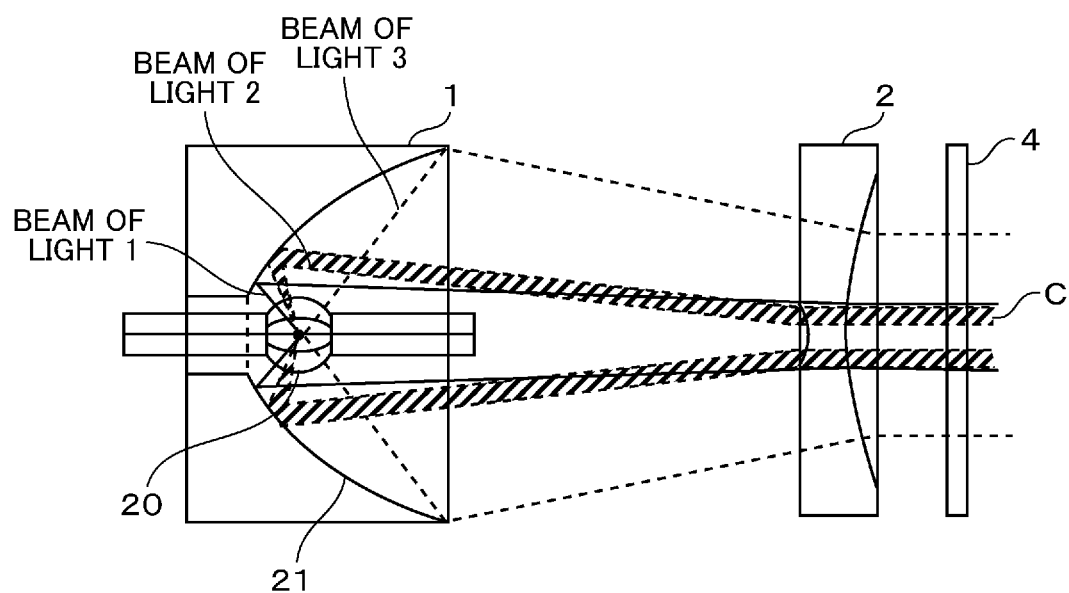

PROJECTION TYPE IMAGE DISPLAY APPARATUS FOR IMPROVING ILLUMINATION OF A LIGHT SOURCE

TECHNICAL FIELD

The present invention relates to a projection type image display apparatus, and more particularly to improvement in performance of a light source for illumination.

BACKGROUND ART

A light source for illumination used in a projection type image display device such as a liquid crystal projector is used with a reflector in order to efficiently make a light flux emitted from a lamp be incident on a limited plane.

As background technology in this technical field, there is JP 2008-242156 A (Patent Document 1). Patent Document 1 intends to provide a compact light source device with little light loss and a projector incorporating the light source device, in which a reflector is constituted by first, second, third, and fourth reflector portions which are parts of a spheroid. A first focal point of each of the reflector portions is disposed at a light emission point of a light emission tube, and a second focal point of each of the reflector portions is disposed on the side of each of the reflector portions with respect to a system optical axis. Thereby, it is disclosed that the light reflected by each of the reflector portions can be prevented from being blocked by a light emission tube or a sub-reflection mirror around the system optical axis.

CITATION LIST

Patent Document

Patent Document 1: JP 2008-242156 A

SUMMARY OF THE INVENTION

Problems to be Solved by the Invention

In Patent Document 1, there is provided a reflector which is a reflection mirror having a plurality of ellipsoidal surfaces that respectively reflect light-source light emitted from a light emission tube, and the plurality of ellipsoidal surfaces are divided from each other by a boundary line on a plane including the system optical axis. A first focal point of each ellipsoidal surface constituting the plurality of ellipsoid surfaces is disposed at a light emission center of the light emission tube, and a second focal point of each ellipsoidal surface constituting the plurality of ellipsoidal surfaces is arranged on a side where each ellipsoidal surface is present with respect to the system optical axis. Further, a concave lens for collimation, and a prism for aligning the light flux emitted from the concave lens in the same direction are provided. Therefore, there is a problem that special reflectors and optical parts are required, so that an apparatus becomes expensive, the number of manufacturing steps increases and a yield gets worse.

The present invention intends to provide, in consideration of the aforementioned problem, a projection type image display device which is simple in configuration, low in cost, and improved in reliability and brightness of an illumination light source.

Solutions to Problems

In order to solve the above problems, the present invention provides a projection type image display apparatus including, for example, a lamp; a reflector that reflects a light flux emitted from the lamp; a collimation lens that collimates the light reflected by the reflector; a light modulation device that modulates the collimated light to output the modulated light; and a projection lens that projects the modulated light. The reflector is configured to prevent the lamp from being irradiated with the reflected light of the light flux emitted from the lamp, and the collimation lens is formed of one biconcave lens having concave surfaces on both an incident side and an exit side thereof.

Effects of the Invention

According to the present invention, it is possible to provide a projection type image display apparatus which is simple in configuration, low in cost, and improved in reliability and brightness of an illumination light source.

BRIEF DESCRIPTION OF THE DRAWINGS

FIG. 2 is an explanatory view of a beam of light emitted from a lamp as a premise of the present embodiment.

FIG. 5 is a configuration diagram of an illumination apparatus according to the present embodiment.

MODE FOR CARRYING OUT THE INVENTION

Hereinafter, embodiments of the present invention will be described with reference to the drawings.

Embodiment

Figure 1:
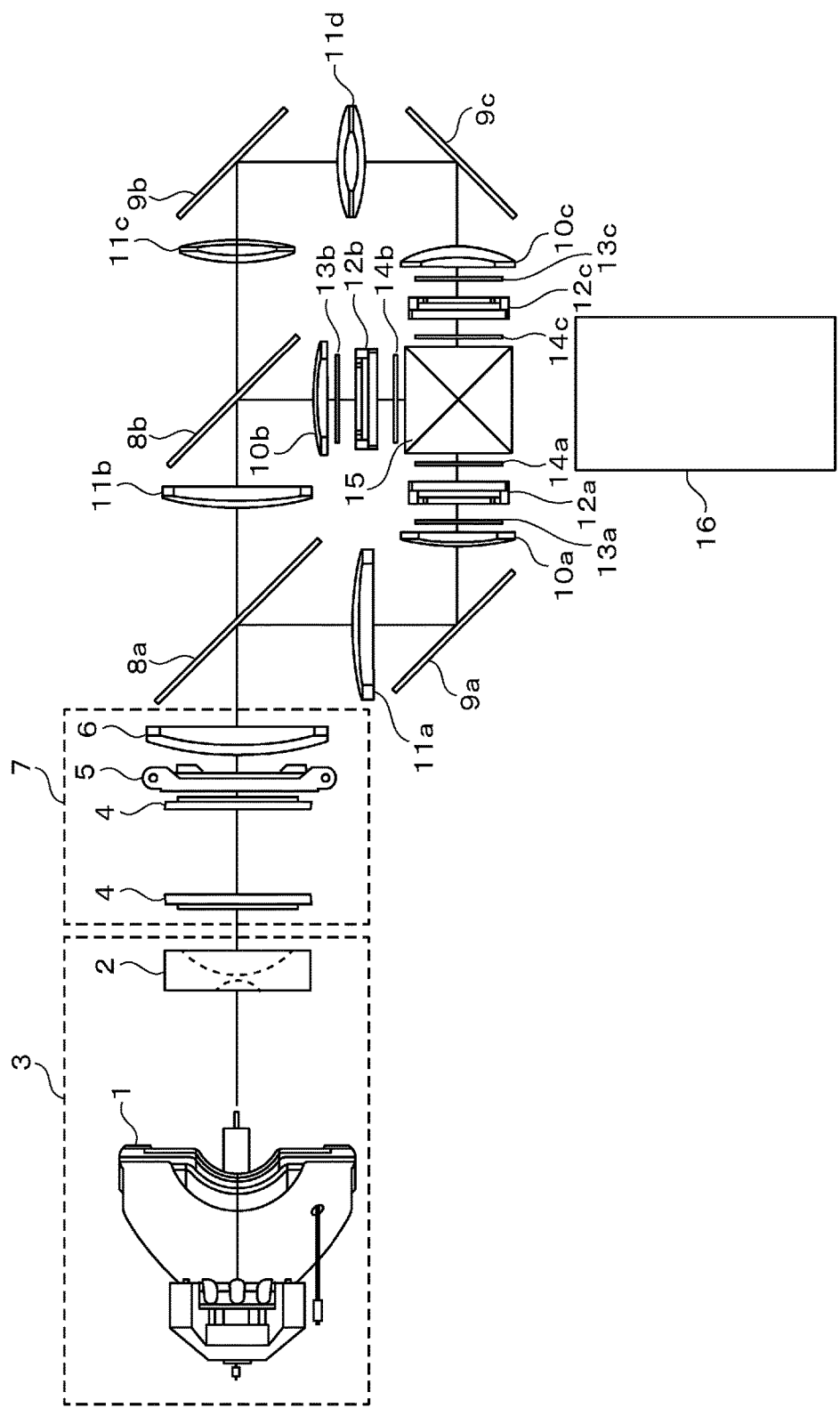
FIG. 1 is a conceptual diagram of an overall configuration of a projection type image display apparatus in the present embodiment.

FIG. 1 is a conceptual diagram of an overall configuration of a projection type image display apparatus according to the present embodiment. In the present embodiment, a liquid crystal projector using a liquid crystal panel will be described as an example of a projection type image display apparatus.

In FIG. 1, reference numeral 1 denotes a light source unit including a lamp and a reflector for reflecting a light flux from the lamp and collecting the light flux in a predetermined direction, which are described later, and reference numeral 2 denotes a biconcave lens for converting light from the reflector to be described later into a collimated light. Here, the light source unit 1 and the biconcave lens 2 are collectively referred to as an illumination apparatus 3. Reference numeral 4 denotes an integrator lens for enhancing uniformity of illuminance on an irradiation surface, reference numeral 5 denotes a polarization conversion element (prism beam splitter: PBS) for aligning a polarization direction in a linear direction, and reference numeral 6 denotes a superimposing lens for converging an illumination light passing through the polarization conversion element 5 and illuminating an illuminated region of a light modulation device for each color in the subsequent stage. Here, the integrator lens 4, the polarization conversion element 5, and the superimposing lens are collectively referred to as an illumination optical system 7.

Reference numerals 8a and 8b denote dichroic mirrors, reference numerals 9a, 9b and 9c denote reflection mirrors, and reference numerals 10a, 10b and 10c denote field lenses, which constitute a color separation optical system 18, respectively. The color separation optical system 18 separates an illumination light formed by an illumination optical system 7 into three colors of red (R), green (G), and blue (B), and leads respective color lights to the light modulation devices in the subsequent stage. Specifically, first, a dichroic mirror 8a transmits R light and G light and reflects B light among the three colors of RGB. Further, a dichroic mirror 8b reflects the G light and transmits the R light among the two colors RG. Next, in the color separation optical system 18, the B light reflected by the dichroic mirror 8a is incident on a field lens 10a for adjusting an incident angle via a relay lens 11a and a reflection mirror 9a. Further, the G light transmitted through the dichroic mirror 8a and further reflected by the dichroic mirror 8b is incident on a field lens 10b for adjusting an incident angle. Further, the R light transmitted through the dichroic mirror 8b is incident on a field lens 10c for adjusting an incident angle via a relay lens 11c, a reflection mirror 9b, a relay lens 11d, and a reflection mirror 9c.

Three liquid crystal panels 12a, 12b, and 12c respectively illuminated corresponding to the respective color lights emitted from the color separation optical system 18, three first polarization filters 13a, 13b and 13c respectively arranged on incident sides of the liquid crystal panels, and three second polarization filters 14a, 14b and 14c respectively arranged on emission sides of the liquid crystal panels are provided. The liquid crystal panels, the first polarization filters, and the second polarization filters constitute the light modulation devices for the respective colors. The B light reflected from the dichroic mirror 8a is incident on and illuminates the liquid crystal panel 12a via the field lens 10a and the like. The G light transmitted through the dichroic mirror 8a and reflected by the dichroic mirror 8b is incident on and illuminates the liquid crystal panel 12b via the field lens 10b and the like. The R light transmitted through the dichroic mirrors 8a and 8b is incident on and illuminates the liquid crystal panel 12c via the field lens 10c and the like. Each of the liquid crystal panels 12a, 12b, and 12c modulates a spatial intensity distribution of the incident illumination light, and the light of three colors incident on each of the liquid crystal panels is modulated according to a driving signal or an image signal inputted as an electric signal to each of the liquid crystal panels. At this time, polarization directions of the illumination lights incident on the liquid crystal panels 12a, 12b and 12c are adjusted by the first polarization filters 13a, 13b and 13c respectively, and modulated lights in predetermined polarization directions are extracted from modulated lights emitted from the liquid crystal panels 12a, 12b and 12c by the second polarization filters 14a, 14b and 14c respectively. Thus, the modulated light of each color is formed.

A cross dichroic prism 15 combines the modulated lights from the light modulation devices of the respective colors. A projection lens 16 enlarges an image light by the combined light formed via the cross dichroic prism 15 at a desired enlargement ratio and projects a color image onto a screen (not illustrated).

FIG. 2 is an explanatory view of a beam of light emitted from a lamp as a premise of the present embodiment. In FIG. 2, the light source unit 1 includes a lamp 20 and a reflector 21 that reflects a light flux from the lamp 20 and collects it in a predetermined direction. The light flux emitted from the lamp 20 is reflected in the predetermined direction by the reflector 21, and the light flux is collected to the illumination optical system in the subsequent stage. Here, in order to improve a reliability of the lamp 20, it is necessary to suppress a temperature rise of the lamp, and it is effective to design a shape of a reflection surface of the reflector 21 so as to prevent the lamp 20 from being irradiated with the beam of light reflected by the reflector 21. In order to achieve the above, the shape of the reflection surface of the reflector 21 may be made in an aspherical shape such that a focal length is made longer with respect to a region that reflects the beam of light 1 passing near the lamp 20 and the focal length is made relatively short with respect to a region that reflects the other beams of light 2 and 3, as illustrated in FIG. 2.

Figure 3:
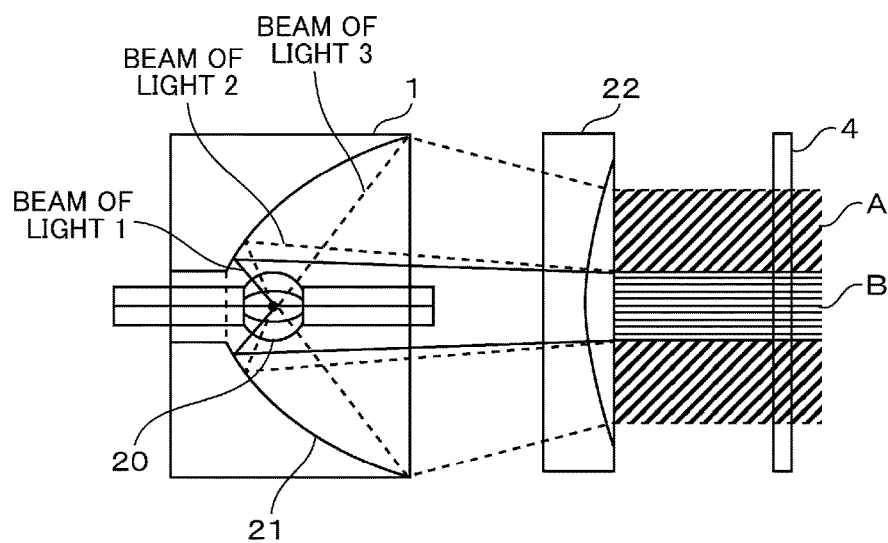
FIG. 3 is a reference example of an illumination apparatus for explaining the present embodiment.

FIG. 3 is a reference example of an illumination apparatus. As illustrated in FIG. 3, since a collimated light needs to be incident on the integrator lens 4, a case where a concave lens 22 is arranged as a collimation lens in the subsequent stage of the reflector 21 will be considered. In FIG. 3, in order to increase a parallelism of all the beams of light 1 to 3, it is desirable to arrange the concave lens 22 at a position before the beam of light 1 having a long focal length and the beam of light 2 having a short focal length intersect with each other. However, in such an arrangement, a light intensity on the integrator lens 4 is high in a region A, and the light intensity is low in a region B in a center part. For this reason, there is a problem that brightness of the projection type image display apparatus as a whole is lowered.

Figure 4:
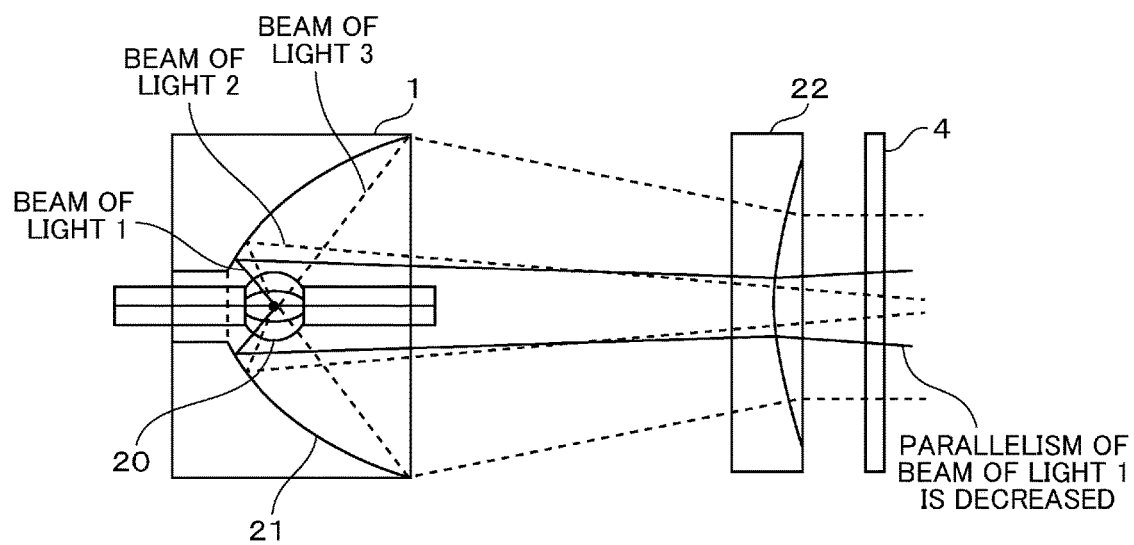
FIG. 4 is another reference example of an illumination apparatus for explaining the present embodiment.

FIG. 4 is another reference example of the illumination apparatus. As illustrated in FIG. 4, in order to increase the light intensity at the central portion of the integrator lens 4, it is effective to arrange the concave lens 22 at a position close to the focal length of the reflector 21. However, the focal positions of the beam of light 1 having the long focal length and the beams of light 2 and 3 having the short focal length are different, and it is difficult to distinguish adjacent beams of light and collimate all the beams of light. For example, if the beam of light 2 is collimated, there is a problem that the beam of light 1 becomes a divergent light, thus decreasing the parallelism. Further, an incident angle of the beam of light 2 having a shorter focal length when the beam is incident on the concave lens 22 is larger than that of the beam of light 1 having a longer focal length. Therefore, in order to make the beam of light 2 be a collimated light, it is necessary to correct the beam of light 2 more strongly at the concave lens 22. However, when the beam of light 2 passes through a position close to a lens optical axis compared to the beam of light 1 and the concave lens 22 is constituted by an inexpensive spherical lens, an effect of correcting an angle of the beam of light decreases as it approaches the optical axis in the spherical lens. Therefore, the angle of the beam of light 2 cannot be corrected completely, and the beam of light 2 becomes a collected light, as illustrated in FIG. 4.

Therefore, in order to solve the above problem, in the present embodiment, the biconcave lens 2 is arranged at a position close to the focal length of the reflector 21. Hereinafter, description will be made with reference to the drawings.

FIG. 5 is a configuration diagram of an illumination apparatus according to the present embodiment. In FIG. 5, a biconcave lens 2 having a concave surface with a short focal length and a small effective diameter in a predetermined range where the beam of light 2 in the vicinity of the optical axis passes on the incident side of the concave lens is arranged at a position close to the focal length of the reflector 21. As a result, the angle of the beam of light 2 having the short focal length can be brought closer to the beam of light 1 with the long focal length in the biconcave lens 2, and the beam of light 1 with the long focal length and the beam of light 3 with the short focal length around the optical axis are transmitted through a plane portion on an incident side of the biconcave lens 2. Therefore, it is not affected by the concave surface with the small diameter. That is, in FIG. 5, a region C is a beam of light passing through a concave lens portion with a small diameter of an incident surface of the biconcave lens 2, and an angle of the beam of light is corrected by the concave lens portion with the small diameter. On the other hand, the light (beam of light 3) passing through a plane portion on the incident side of the biconcave lens 2 is not affected by the concave surface with the small diameter, but the angle of the beam of light is corrected by a concave surface with a large diameter on an exit side of the biconcave lens 2. As a result, all the beams of light can be substantially parallel. Therefore, a light intensity at the center of the integrator lens 4 can be increased, and the brightness of the projection type image display apparatus can be improved. Although the beam of light 1 does not pass through the concave surface on the incident side of the biconcave lens 2, it is possible to increase a radius of curvature of the concave surface on the exit side of the biconcave lens 2 compared to the concave lens 22 illustrated in FIG. 4. Thus, the beam of light 1 can be made parallel to the optical axis, as compared with FIG. 4.

Here, the biconcave lens 2 is a single biconcave lens having the concave surface on both the incident side and the exit side, whereby it is possible to reduce the number of parts and to provide an inexpensive apparatus. In addition, each of the the concave surfaces of the biconcave lens 2 is a spherical lens which is not an aspherical lens, whereby the number of steps for preparing the lens can be further reduced and an inexpensive apparatus can be provided. Further, an effective diameter of the concave surface on the incident side of the biconcave lens 2 is made smaller than an effective diameter of the concave surface on the exit side of the biconcave lens 2, whereby the light intensity at the central portion of the integrator lens 4 can be increased.

As described above, according to the present embodiment, the projection type image display apparatus is provided which includes the lamp, the reflector that reflects the light flux emitted from the lamp, the collimation lens that converts the light reflected by the reflector to the collimated light, a light modulation device that modulates the collimated light to output the modulated light, and the projection lens that projects the modulated light. The reflector is configured to prevent the lamp from being irradiated with the reflected light of the light flux emitted from the lamp, and the collimation lens is formed of one biconcave lens having concave surfaces on both the incident side and the exit side.

Further, each of the concave lenses of both sides constituting the biconcave lens is a spherical lens. In addition, the effective diameter of the concave surface on the incident side of the biconcave lens is made smaller than an effective diameter of the concave surface on the exit side of the biconcave lens.

Thereby, it is possible to provide a projection type image display apparatus which is simple in configuration, low in cost, and improved in reliability and brightness of an illumination light source.

Although the embodiments have been described above, the present invention is not limited to the embodiments described above but includes various modifications. For example, the aforementioned embodiments have been described in detail in order to explain the present invention in an easy-to-understand manner and are not necessarily limited to those including all the configurations described.

REFERENCE SIGNS LIST

1: light source unit, 2: biconcave lens, 3: illumination apparatus, 4: integrator lens, 5: polarization conversion element (prism beam splitter: PBS), 6: superimposing lens, 7: illumination optical system, 8a and 8b: dichroic mirror, 9a, 9b and 9c: reflection mirror, 10a, 10b and 10c: field lens, 11a, 11b, 11c and 11d: relay lens, 12a, 12b and 12c: liquid crystal panel, 13a, 13b and 13c: first polarization filter, 14a, 14b and 14c: second polarization filter, 15: cross dichroic prism, 16: projection lens, 18: color separation optical system, 20: Lamp, 21: reflector, 22: concave lens

The invention claimed is:

1. A projection type image display apparatus comprising: a lamp; a reflector that reflects a light flux emitted from the lamp; a collimation lens that collimates the light reflected by the reflector; a light modulation device that modulates the collimated light to output the modulated light; and a projection lens that projects the modulated light,
   wherein the reflector is configured to prevent the lamp from being irradiated with the reflected light of the light flux emitted from the lamp,
   wherein the collimation lens is formed of one biconcave lens having concave surfaces on both an incident side and an exit side of the biconcave lens, and
   wherein an effective diameter of the concave surface on the incident side of the biconcave lens is made smaller than an effective diameter of the concave surface on the exit side of the biconcave lens.

2. The projection type image display apparatus according to claim 1, wherein each of concave lenses of both sides constituting the biconcave lens is a spherical lens.

3. The projection type image display apparatus according to claim 1,
   wherein the reflector is formed in an aspherical shape such that a focal length is made long with respect to a region that reflects a beam of light passing near the lamp and the focal length is made relatively short with respect to a region that reflects the other beams of light.

4. The projection type image display apparatus according to claim 3,
   wherein the beam of light of the long focal length passes through the concave surface on the exit side of the biconcave lens without passing through the concave surface on the incidence side of the biconcave lens, a portion of the beam of light of the short focal length in the vicinity of an optical axis passes through the concave surfaces on both the incident side and the exit side of the biconcave lens, and a portion of the beam of light of the short focal length around the optical axis passes through the concave surface on the exit side of the biconcave lens without passing through the concave surface on the incidence side of the biconcave lens.

5. The projection type image display apparatus according to claim 1, further comprising:
   an illumination optical system that increases uniformity of illuminance of the collimated light and forming an illumination light;
   a color separation optical system that separates the illumination light formed by the illumination optical system into color lights of three colors of red (R), green (G), and blue (B);

a light modulation device for each color, the light modulation device modulating each of color lights emitted from the color separation optical system and outputting a modulated light;

a cross dichroic prism that combines the modulated light from the light modulation device; and a projection lens that projects an image light by the combined light formed via the cross dichroic prism.

6. The projection type image display apparatus according to claim 5, wherein the projection type image display device is a liquid crystal projector, and wherein the light modulation device includes a liquid crystal panel and a polarization filter, and light incident on the liquid crystal panel is modulated according to an image signal input as an electric signal to the liquid crystal panel.

7. A projection type image display apparatus comprising: a lamp; a reflector that reflects a light flux emitted from the lamp; a collimation lens that collimates the light reflected by the reflector; a light modulation device that modulates the collimated light to output the modulated light; and a projection lens that projects the modulated light, wherein the reflector is configured to prevent the lamp from being irradiated with the reflected light of the light flux emitted from the lamp, wherein the reflector is formed in an aspherical shape such that a focal length is made long with respect to a region that reflects a beam of light passing near the lamp and the focal length is made relatively short with respect to a region that reflects the other beams of light, wherein the collimation lens is formed of one biconcave lens having concave surfaces on both an incident side and an exit side of the biconcave lens, and wherein the beam of light of the long focal length passes through the concave surface on the exit side of the biconcave lens without passing through the concave surface on the incidence side of the biconcave lens, a portion of the beam of light of the short focal length in the vicinity of an optical axis passes through the concave surfaces on both the incident side and the exit side of the biconcave lens, and a portion of the beam of light of the short focal length around the optical axis passes through the concave surface on the exit side of the biconcave lens without passing through the concave surface on the incidence side of the biconcave lens.

8. The projection type image display apparatus according to claim 7, wherein each of concave lenses of both sides constituting the biconcave lens is a spherical lens.

9. The projection type image display apparatus according to claim 7, wherein an effective diameter of the concave surface on the incident side of the biconcave lens is made smaller than an effective diameter of the concave surface on the exit side of the biconcave lens.

10. The projection type image display apparatus according to claim 7, further comprising:

an illumination optical system that increases uniformity of illuminance of the collimated light and forming an illumination light;

a color separation optical system that separates the illumination light formed by the illumination optical system into color lights of three colors of red (R), green (G), and blue (B);

a light modulation device for each color, the light modulation device modulating each of color lights emitted from the color separation optical system and outputting a modulated light;

a cross dichroic prism that combines the modulated light from the light modulation device; and a projection lens that projects an image light by the combined light formed via the cross dichroic prism.

11. The projection type image display apparatus according to claim 10, wherein the projection type image display device is a liquid crystal projector, and wherein the light modulation device includes a liquid crystal panel and a polarization filter, and light incident on the liquid crystal panel is modulated according to an image signal input as an electric signal to the liquid crystal panel.

* * * * *